United States Patent
Kadathur et al.

(10) Patent No.: US 8,405,514 B2
(45) Date of Patent: Mar. 26, 2013

(54) POWER SUPPLY DETECTION AND INDICATION

(75) Inventors: Srinivasan Kadathur, Pflugerville, TX (US); Stephen Seitsinger, Austin, TX (US); John Stuewe, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 827 days.

(21) Appl. No.: 12/553,214

(22) Filed: Sep. 3, 2009

(65) Prior Publication Data

US 2011/0050438 A1    Mar. 3, 2011

(51) Int. Cl.
G08B 21/00    (2006.01)

(52) U.S. Cl. .................................. 340/644; 713/300

(58) Field of Classification Search .................. 340/644; 713/300, 310; 318/293
See application file for complete search history.

(56) References Cited

U.S. PATENT DOCUMENTS

| | | | |
|---|---|---|---|
| 6,215,264 B1 * | 4/2001 | Ma | 318/293 |
| 6,795,926 B1 * | 9/2004 | Matula et al. | 713/300 |

* cited by examiner

*Primary Examiner* — Shirley Lu
(74) *Attorney, Agent, or Firm* — Haynes and Boone, LLP

(57) ABSTRACT

A power detection and indication circuit device includes a processor, a signal conditioning circuit coupled to the processor and an indicator coupled to the signal conditioning circuit. The power detection and indication circuit performs a test to determine the presence of a switch coupled to the processor through the conditioning circuit. In response to determining that the switch is coupled to the processor through the conditioning circuit, the power detection and indication circuit performs a test to determine a status of the switch and provides an indication of the status of the switch using the indicator.

20 Claims, 5 Drawing Sheets ant POWER SUPPLY DETECTION AND
INDICATION

BACKGROUND

The present disclosure relates generally to information handling systems (IHSs), and more particularly a system for power supply detection and indication for an IHS.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs generally have a power supply that supplies low voltage power (e.g., 3.3 v) known as auxiliary power (AUX) when the IHS is "plugged-in" to a line voltage or other power supply. This auxiliary power is supplied to the IHS even when the IHS is powered down/off. To indicate that this auxiliary electrical power is present on the internal circuitry of the IHS (e.g., a motherboard), a light emitting diode (LED) or other light indicator device is lit-up on the circuitry board. This LED is powered all the time that the IHS is receiving the auxiliary power when the IHS is plugged-in, whether the IHS is on or off.

With respect to energy consciousness, IHS consumers and government regulators are decreasing requirements on how much power an IHS can consume in the off/powered-down state. For example, there is continuing pressure for IHSs to consume less power when they are in their off state (see for example, Federal Energy Management Programs (FEMP) and the European Union Energy Using Products (EU EuP) bulletin 080214-01). As mentioned above, IHSs traditionally have an LED powered from an auxiliary power bus to indicate that the system circuitry board has power. However, with stricter power requirements, the power that this auxiliary power detection circuit LED draws is now a significant portion of the IHS's off power budget.

Accordingly, it would be desirable to provide an improved power supply detection and indication system for IHSs.

SUMMARY

According to one embodiment, a power detection and indication circuit device includes a processor, a signal conditioning circuit coupled to the processor and an indicator coupled to the conditioning circuit. The conditioning circuit initiates a test to determine the presence of a switch. In response to determining that the switch is present, the conditioning circuit initiates a test to determine a status of the switch and provides an indication of the status of the switch using the indicator.

DETAILED DESCRIPTION

For purposes of this disclosure, an information handling system (IHS) includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a network storage device, or any other suitable device and may vary in size, shape, performance, functionality, and price. The IHS may include random access memory (RAM), one or more processing resources such as a central processing unit (CPU) or hardware or software control logic, read only memory (ROM), and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 1:
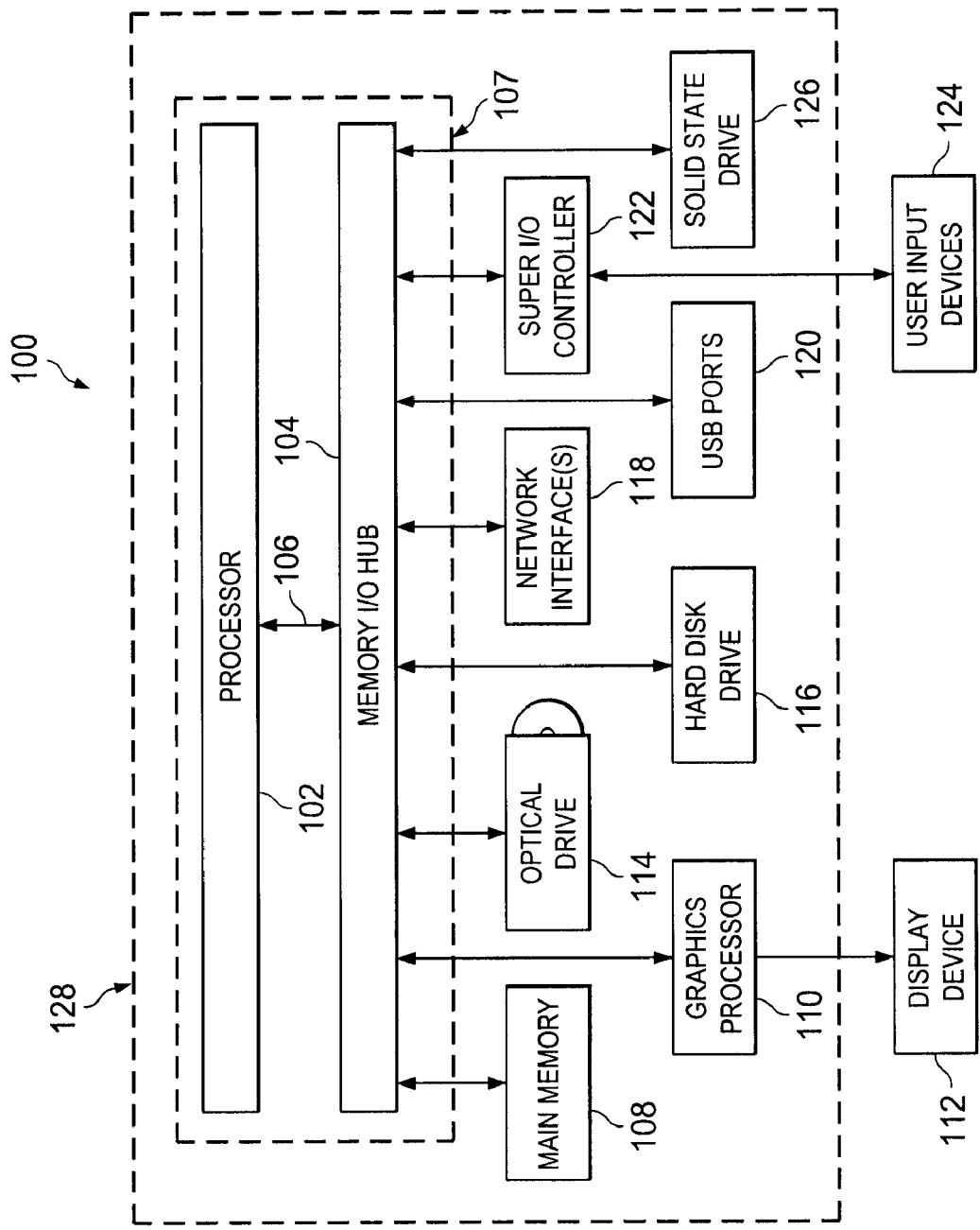
FIG. 1 illustrates a block diagram of an embodiment of an information handling system (IHS).

FIG. 1 is a block diagram of one type of IHS 100. This IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Figure 2:
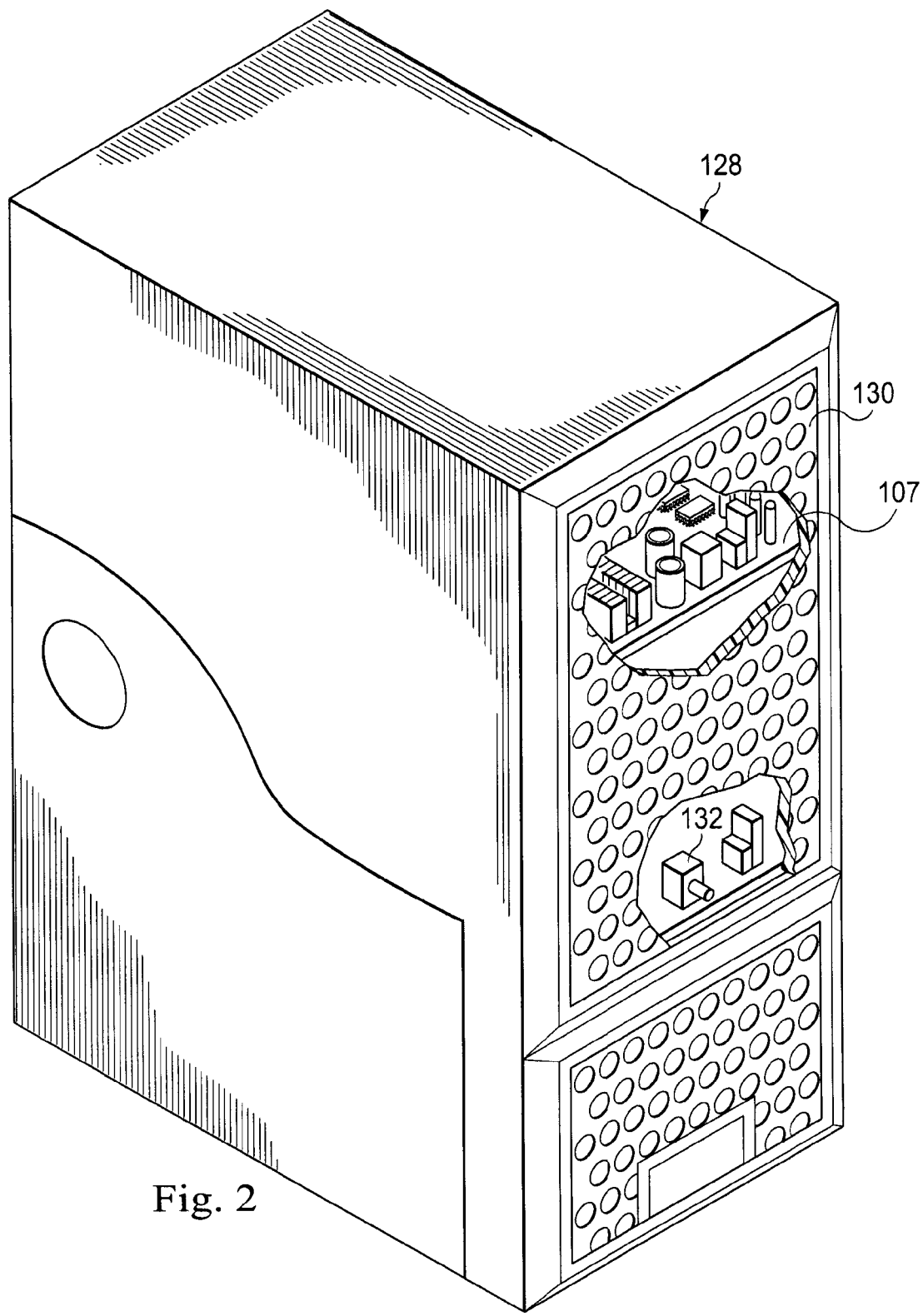
FIG. 2 illustrates a perspective view of an embodiment of the IHS of FIG. 1.

The processor 102 and the memory I/O hub 104 are coupled together on a printed circuit board known as the motherboard 107. Additionally, other components of the IHS 100 may be placed on the motherboard 107. FIG. 2 illustrates a perspective view of an embodiment of the IHS 100, including the mother board 107 in a chassis 128. As shown, the chassis 128 illustrates a tower-type IHS chassis. In the alternative, a chassis of the IHS 100 may be a rack-type chassis, a notebook-type chassis, a handheld-type chassis or any other type of chassis. The chassis 128 includes an openable door 130. The door 130 allows one to gain access to the motherboard 107 and/or other IHS components. When the door 130 is opened, a switch 132 closes its electrical contacts, signaling to the processor 102 that the door 132 of the chassis 128 has been opened. In the alternative, the switch 132 may open its contacts to signal to the processor 102 that the door 130 has opened.

The IHS 100 is supplied electrical power by a power supply (not shown) that is plugged-in to a wall/line voltage supply. Additionally, the IHS includes one or more batteries (not shown) that may power the IHS 100 when the IHS 100 is not plugged-in. The power supply and the batteries provide different levels (e.g., different voltages) of electrical potential to power supply rails, which power the components, such as the processor 102, the memory 108 and etc., of the IHS 100. The power supply and/or one or more of the batteries provides an auxiliary (AUX) power (e.g., approximately 3.3 volts) to one or more auxiliary power rails when the IHS 100 is powered down.

Not all IHSs 100 include each of the components shown in FIGS. 1 and 2, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

Traditionally IHSs have had a light emitting diode (LED) powered directly from the AUX power rail to indicate that the main power supply is plugged-in to a wall/line voltage supply and that the motherboard 107 has electrical power present. This indicates to a user, service technician or other that while the IHS 100 is not running or in an "on" mode, the system still has live electrical power that may damage components of the IHS 100 if the electrical power is shorted to the IHS components. However, with stricter power usage requirements being placed on IHS manufacturers, the power that this LED consumes is a significant portion of the IHS's 'off' mode power budget. Therefore, it is desirable for IHSs to consume very little power when they are powered down or are otherwise in an 'off' mode.

The electrical risk to the IHS components is very small when the chassis 128 is closed. Also, if the LED is located on the motherboard 107, it is unlikely that anyone will see it even if it is turned on when the door 130 of the chassis 128 is closed. Therefore, the LED does not need to be powered/illuminated when the door 130 is closed. The switch 132 is used to detect whether the chassis door 130 is opened or closed. Accordingly, the present disclosure provides a system that uses the chassis intrusion switch 132, a signal conditioning circuit and an AUX power indicator circuit to indicate when AUX power is present on the motherboard 107, so that the indicator is not powered when the chassis door 130 is closed. As such, this will help the system meet the lower power guidelines.

Figure 3:
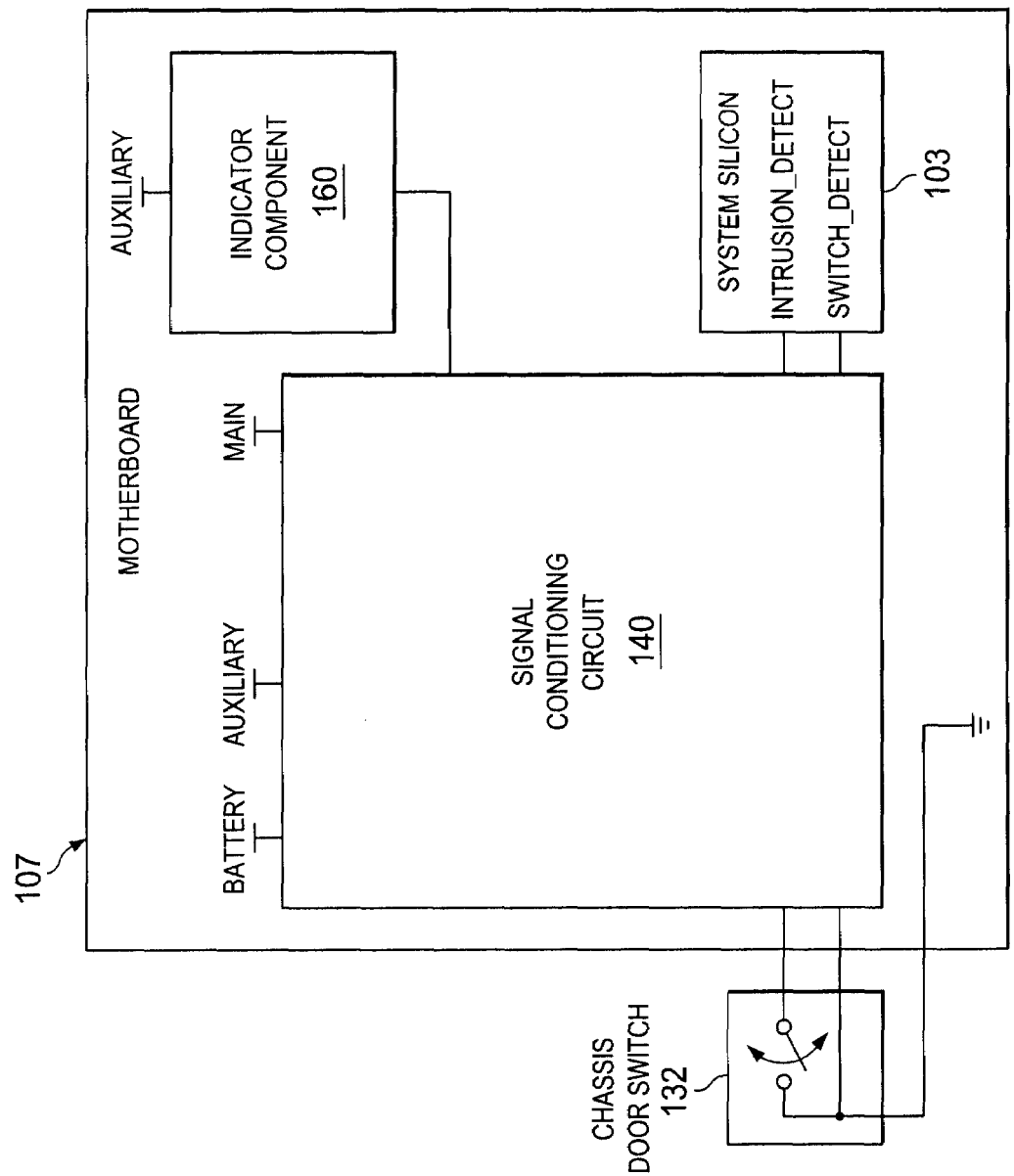
FIG. 3 illustrates a block diagram of an embodiment of a power supply detection and indication circuit for the IHS of FIG. 1.
Figure 4:
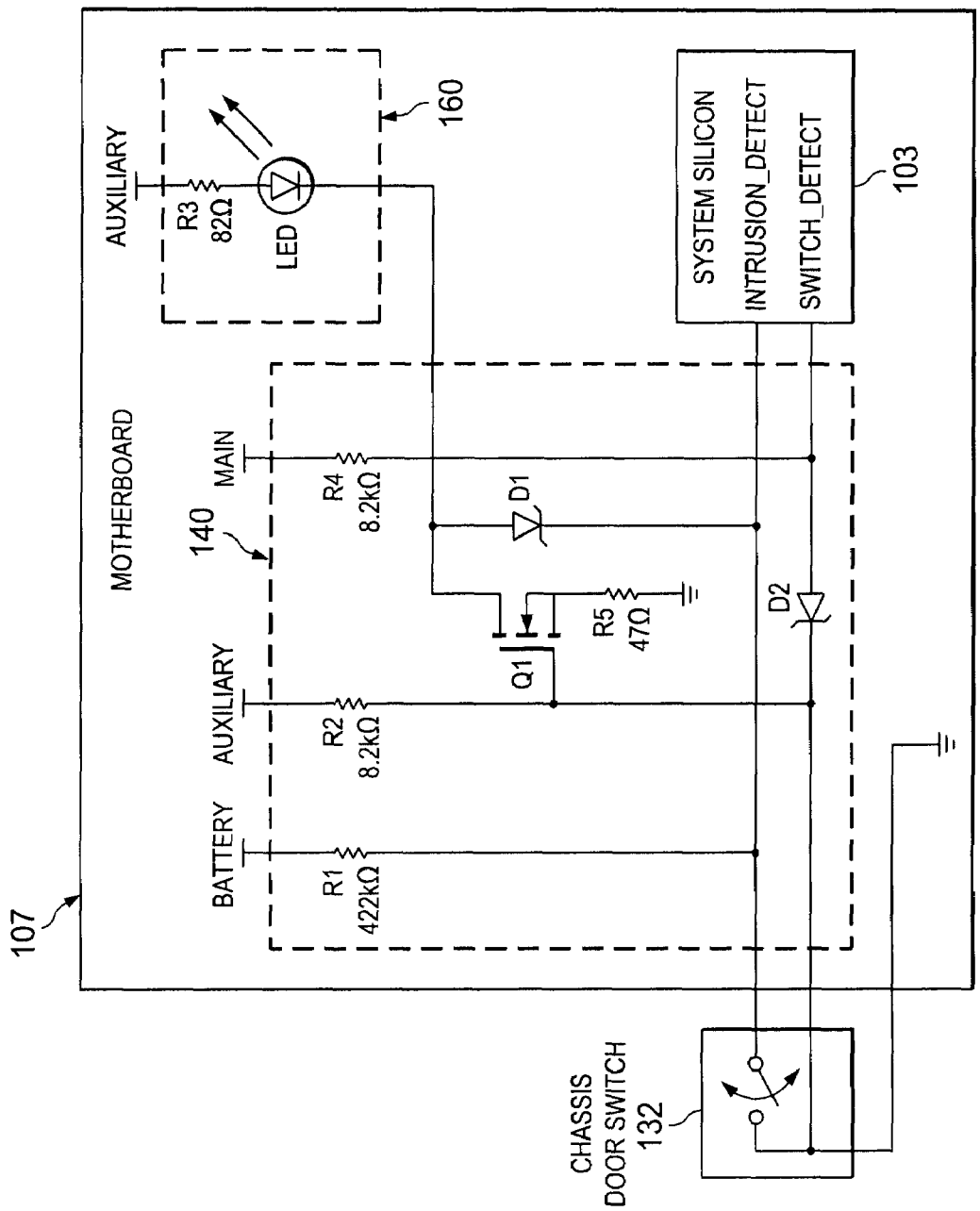
FIG. 4 illustrates a schematic diagram of an embodiment of a power supply detection and indication circuit for the IHS of FIG. 1.

FIG. 3 illustrates a block diagram of an embodiment of a power supply detection and indication circuit for the IHS 100 and FIG. 4 illustrates a schematic diagram of the embodiment of a power supply detection and indication circuit for the IHS 100. Generally the AUX power rail is ON (e.g., approximately 3.3 volts) any time the main power supply for the IHS 100 is plugged-in or otherwise powered. The BAT power rail is ON (e.g., approximately 3 volts) all the time even when the main power supply for the IHS 100 is not plugged-in. MAIN is all other power rails in the IHS 100 and is ON only when the IHS 100 is fully operational with voltage levels compatible with the system silicon 103 on the motherboard 107. On the motherboard 107, the system silicon 103 is comprised of some or all of the components on the motherboard 107 and is coupled to the chassis door switch 132 through a signal conditioning circuit 140 which is also located on the motherboard 107. The signal conditioning circuit 140 also couples to an indicator component (e.g., an LED circuit) 160. Specific components and operation of the embodiment of FIG. 3 are described in more detail with reference to FIG. 5 below.

Figure 5:
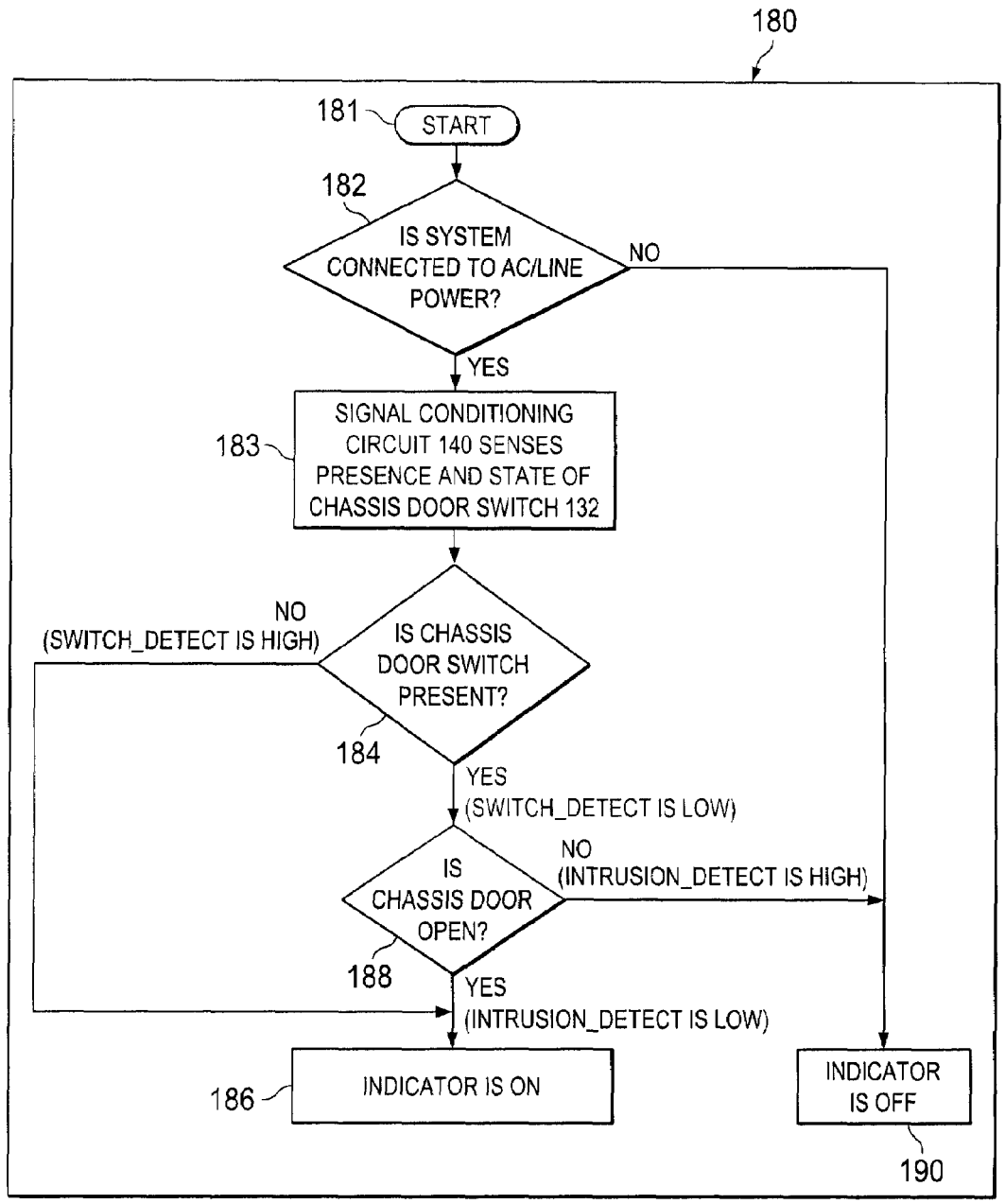
FIG. 5 illustrates a flow chart for an embodiment of a method to detect and indicate auxiliary power for the IHS of FIG. 1.

FIG. 5 illustrates a flow chart for an embodiment of a method 180 to detect and indicate presence of AUX power for the IHS 100. The method 180 begins at block 181 when the main power supply for the IHS 100 is either connected or disconnected from the AC/Line power source. The method 180 proceeds to decision block 182 to determine if the AC/Line power source is present. If no, the method 180 proceeds to block 190 where the LED indicator 160 is turned off.

On the other hand, if yes, the method 180 proceeds to block 183 where the signal conditioning circuit 140 initiates a test to determine whether the chassis door switch 132 is present in the chassis 128 and the status of the chassis door switch 132, either open or closed. The presence of the chassis door switch 132 is coupled to the system silicon 103 through the signal conditioning circuit 140 to the switch_detect port in the system silicon 103. The status of the chassis door switch 132 is coupled to the system silicon 103 through the signal conditioning circuit 140 to the intrusion_detect port in the system silicon 103. The method 180 proceeds to decision block 184 to determine whether the switch 132 is present. If no, the method 180 determines that the switch 132 is not present, (e.g., switch_detect is high), the method 180 proceeds to block 186 where a gate of the field-effect transistor (FET) Q1 is turned on, thus allowing power to illuminate the LED in the indicator 160 using power from AUX to pass through resistor R3, the LED, Q1 and R5 to electrical ground.

On the other hand, if yes, the method 180 determines that the switch 132 is present, (e.g., switch_detect is low), the method 180 does not turn on the indicator 160 using the FET device Q1 at block 186, but rather, the method 180 proceeds to decision block 188 with the indicator LED 160 off. At decision block 188, the method 180 determines whether the chassis door 130 is open by determining a status of the switch 132. As shown in FIG. 4, if the chassis door 130 is open, the electrical contacts of the switch 132 are closed, completing a path to electrical ground from the intrusion_detect port on the system silicon 103 (e.g., intrusion-detect is low). Accordingly, the method 180 proceeds from decision block 188 to block 186 where the indicator LED 160 is now powered on using power from AUX to pass through the resister R3, indicator LED 160, the diode D1, and the closed contacts of the switch 132 to electrical ground.

Conversely, at decision block 188, if the chassis door 130 is closed, the electrical contacts of the switch 132 are open, thus leaving intrusion_detect high, as provided by the BAT electrical power, through resistor R1. BAT is provided by a low amperage battery, such as a coin battery, to sense the switch 132 status, when the switch 132 is coupled to the system silicon 103 via the signal conditioning circuit 140. Because intrusion_detect is high, substantially no current passes through the indicator LED 160 and the method 180 continues to block 190, where the indicator LED 160 is turned off.

In light of the above, the present disclosure provides a detection system to detect the presence of AUX power (when the IHS 100 is plugged-in, but is not on) and then power an indicator device, such as the LED 160, when either the chassis door switch 132 is not present or when the switch 132 is present and indicating that the door 130 is open. Thus, when power is present on the motherboard 107 and there is a risk of someone shorting the electrical power (e.g., the door 130 is open), the indicator LED 160 is on to alert the user/technician that electricity is present on the motherboard 107. At the same time, the indicator LED 160 is not powered when the IHS 100 is plugged in, a chassis door switch 132 is present and the chassis door 130 is closed. As should be understood, this helps in troubleshooting the IHS 100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A power rail status indication system, comprising:
 a chassis including a chassis access member that allows access to a chassis housing;
 an auxiliary power rail that is located in the chassis and that couples to a power supply;
 an indicator that is located in the chassis and that is coupled to the auxiliary power rail;
 a switch that is located on the chassis and that provides a signal indicating a status of the chassis access member; and
 a signal conditioning circuit coupled to the indicator and the switch, wherein the signal conditioning circuit:
  allows power from the auxiliary power rail to activate the indicator to indicate that the auxiliary power rail is receiving power from the power supply in response to determining that the signal from the switch indicates that the status of the chassis access member is allowing access to the chassis housing; and
  prevents power from the auxiliary power rail from activating the indicator such that the indicator does not indicate that the auxiliary power rail is receiving power from the power supply in response to determining that the signal from the switch indicates that the status of the chassis access member is not allowing access to the chassis housing.

2. The device of claim 1, wherein the signal conditioning circuit:
 determines whether the auxiliary power rail is coupled to the power supply, wherein the allowing and the preventing are performed in response to determining that the auxiliary power rail is coupled to the power supply.

3. The device of claim 2, wherein the indicator does not indicate that the auxiliary power rail is receiving power from the power supply when the auxiliary power rail is not coupled to the power supply.

4. The device of claim 1, wherein the signal conditioning circuit:
 determines whether the switch is present, wherein the allowing and the preventing are performed in response to determining that the switch is present.

5. The device of claim 4, wherein the signal conditioning circuit:
 allows power from the auxiliary power rail to activate the indicator to indicate that the auxiliary power rail is receiving power from the power supply in response to determining that the switch is not present.

6. The device of claim 1, wherein the signal conditioning circuit includes a field effect transistor that is coupled between the auxiliary power rail and the indicator and that is powered on to allow power from the auxiliary power rail to activate the indicator when the switch indicates that the chassis access member is allowing access to the chassis housing.

7. The device of claim 1, wherein the indicator is a light emitting diode.

8. An information handling system (IHS) comprising:
 a chassis defining a chassis housing and including a chassis access member that allows access to the chassis housing;
 a processor that is located in the chassis,
 a memory that is located in the chassis and that is coupled to the processor;
 a main power rail that is located in the chassis, that is coupled to the processor and the memory, and that couples to a power supply;
 an auxiliary power rail that is located in the chassis and that couples to the power supply;
 an indicator that is located in the chassis and that is coupled to the auxiliary power rail;
 a switch that is located on the chassis and that provides a signal indicating a status of the chassis access member; and
 a signal conditioning circuit coupled to the indicator and the switch, wherein the signal conditioning circuit:
  allows power from the auxiliary power rail to activate the indicator to indicate that the auxiliary power rail is receiving power from the power supply in response to determining that the signal from the switch indicates that the status of the chassis access member is allowing access to the chassis housing; and
  prevents power from the auxiliary power rail from activating the indicator such that the indicator does not indicate that the auxiliary power rail is receiving power from the power supply in response to determining that the signal from the switch indicates that the status of the chassis access member is not allowing access to the chassis housing.

9. The IHS of claim 8, wherein the signal conditioning circuit:
 determines whether the auxiliary power rail is coupled to the power supply, wherein the allowing and the preventing are performed in response to determining that the auxiliary power rail is coupled to the power supply.

10. The IHS of claim 9, wherein the indicator does not indicate that the auxiliary power rail is receiving power from the power supply when the auxiliary power rail is not coupled to the power supply.

11. The IHS of claim 8, wherein the signal conditioning circuit:
 determines whether the switch is present, wherein the allowing and the preventing are performed in response to determining that the switch is present.

12. The IHS of claim 11, wherein the signal conditioning circuit:
 allows power from the auxiliary power rail to activate the indicator to indicate that the auxiliary power rail is receiving power from the power supply in response to determining that the switch is not present.

13. The IHS of claim 8, wherein the signal conditioning circuit includes a field effect transistor that is coupled between the auxiliary power rail and the indicator and that is powered on to allow power from the auxiliary power rail to activate the indicator when the switch indicates that the chassis access member is allowing access to the chassis housing.

14. The IHS of claim 8, wherein the indicator is a light emitting diode.

15. A method comprising:
   determining whether an auxiliary power rail that is located in a chassis is coupled to a power supply;
   determining whether a switch on the chassis indicates that a chassis access member is providing access to a chassis housing defined by the chassis in response to determining that the auxiliary power rail is coupled to the power supply;
   allowing power from the auxiliary power rail to activate an indicator that is located in the chassis to indicate that the auxiliary power rail is receiving power from the power supply in response to determining that the signal from the switch indicates that the chassis access member is allowing access to the chassis housing; and
   preventing power from the auxiliary power rail from activating the indicator such that the indicator does not indicate that the auxiliary power rail is receiving power from the power supply in response to determining that the signal from the switch indicates that the chassis access member is not allowing access to the chassis housing.

16. The method of claim 15, wherein the indicator does not indicate that the auxiliary power rail is receiving power from the power supply in response to determining that the auxiliary power rail is not coupled to the power supply.

17. The method of claim 15, further comprising:
   determining whether the switch is present, wherein the allowing and the preventing are performed in response to determining that the switch is present.

18. The method of claim 16, further comprising:
   allowing power from the auxiliary power rail to activate the indicator to indicate that the auxiliary power rail is receiving power from the power supply in response to determining that the switch is not present.

19. The method of claim 15, wherein the allowing power from the auxiliary power rail to activate the indicator to indicate that the auxiliary power rail is receiving power from the power supply includes powering on a field effect transistor that is coupled between the auxiliary power rail and the indicator to allow power from the auxiliary power rail to activate the indicator when the switch indicates that the chassis access member is allowing access to the chassis housing.

20. The method of claim 15, including indicator is a light emitting diode.

* * * * *